(12) United States Patent
Hashimoto (10) Patent No.: US 6,826,289 B1
(45) Date of Patent: Nov. 30, 2004

(54) SYSTEM FOR CHANGING ATTRIBUTE OF IMAGE BY ELECTRONIC WATERMARK

(75) Inventor: Masahiro Hashimoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/357,223

(22) Filed: Jul. 20, 1999

(30) Foreign Application Priority Data

Jul. 29, 1998 (JP) .......................................... 10-213875

(51) Int. Cl.[7] .............................................. G06K 9/00
(52) U.S. Cl. ........................ 382/100; 283/17; 283/71; 283/72; 283/113; 345/629; 345/638; 345/641; 380/54; 380/201; 382/250; 382/294; 382/305; 713/176
(58) Field of Search .............................. 283/17, 74, 72, 283/113; 380/51–54, 200, 287; 382/100, 232, 237, 294, 250, 276, 305; 713/176; 345/629, 630, 638, 641

(56) References Cited

U.S. PATENT DOCUMENTS

| 5,875,249 A | * | 2/1999 | Mintzer et al. ................ 380/54 |
| 5,915,027 A | * | 6/1999 | Cox et al. ...................... 380/54 |
| 5,930,369 A | * | 7/1999 | Cox et al. ...................... 380/54 |
| 6,101,602 A | * | 8/2000 | Fridrich ....................... 713/176 |

(List continued on next page.)

FOREIGN PATENT DOCUMENTS

| JP | He 7-212712 | 8/1995 |
| JP | He 8-211857 | 8/1996 |
| JP | 8-241403 | 9/1996 |
| JP | 08275127 A | 10/1996 |
| JP | 09191394 A | 7/1997 |
| WO | WO 97/13248 | 4/1997 |
| WO | WO 98/31152 | 7/1998 |
| WO | WO 99/11064 | 3/1999 |
| WO | WO 99/18723 | 4/1999 |

OTHER PUBLICATIONS

News Report, Nikkei Electronics, 1996, 4.22, No. 660, 13 p., "NEC, developed a method for embedding ID information in digital publications a measure against illegal reproductions".

Primary Examiner—Bhavesh M. Mehta
Assistant Examiner—Gregory Desire
(74) Attorney, Agent, or Firm—Scully, Scott, Murphy & Presser (57) ABSTRACT

In the attribute detection apparatus in the system of the present invention, an inputted image is transformed by DCT means to extract an estimation value of the embedded electronic watermark data in frequency space. Then, the statistical similarity between known electronic watermarks and the extracted electronic watermark data are calculated. The attribute change apparatus in a system of the present invention comprises a selector, an insert data register for storing the output of the selector, a brightness register for storing the brightness signal of the inputted image, a color difference register for storing the color difference signal of the inputted image, and adder for adding the output of the color difference register and the output of the insert data register. Here, the selector selects one of the insert data stored in a plurality of memory areas on the basis of the attribute inputted from attribute detection apparatus.

8 Claims, 11 Drawing Sheets

U.S. PATENT DOCUMENTS

| | | | |
|---|---|---|---|
| 6,175,639 B1 * | 1/2001 | Satoh et al. | 382/100 |
| 6,208,735 B1 * | 3/2001 | Cox et al. | 380/54 |
| 6,222,932 B1 * | 4/2001 | Rao et al. | 382/100 |
| 6,239,818 B1 * | 5/2001 | Yoda | 347/43 |
| 6,246,775 B1 * | 6/2001 | Nakamura et al. | 382/100 |
| 6,252,971 B1 * | 6/2001 | Wang | 382/100 |
| 6,263,086 B1 * | 7/2001 | Wang | 382/100 |
| 6,272,634 B1 * | 8/2001 | Tewfik et al. | 713/176 |
| 6,278,792 B1 * | 8/2001 | Cox et al. | 382/100 |
| 6,285,775 B1 * | 9/2001 | Wu et al. | 382/100 |
| 6,298,142 B1 * | 10/2001 | Nakano | 382/100 |
| 6,345,104 B1 * | 2/2002 | Rhoads | 382/100 |
| 6,359,998 B1 * | 3/2002 | Cooklev | 382/100 |
| 6,389,152 B2 * | 5/2002 | Nakamura et al. | 382/100 |
| 6,470,090 B2 * | 10/2002 | Oami et al. | 382/100 |
| 6,510,233 B1 * | 1/2003 | Nakano | 382/100 |
| 6,707,465 B2 * | 3/2004 | Yamazaki et al. | 345/629 |
| 6,721,438 B1 * | 4/2004 | Iwamura et al. | 382/100 |
| 6,728,408 B1 * | 4/2004 | Echizen et al. | 382/232 |
| 6,763,121 B1 * | 7/2004 | Shaked et al. | 382/100 |

* cited by examiner

SYSTEM FOR CHANGING ATTRIBUTE OF IMAGE BY ELECTRONIC WATERMARK

BACKGROUND OF THE INVENTION

1. Technical Field of the Invention

The present invention relates to a system for changing an attribute of image by electronic watermarks, wherein the attribute of image with an inserted watermark is changed by adding another electronic watermark.

2. Description of the Prior Art

Recently, it has become important to prevent reproduction of image information. Therefore, Image information are accompanied very often by some kind of attributes which are identifiers to instruct commands such as "reproduction prohibited", or "reproduction allowed only once".

One of the conventional techniques for adding the attribute to image information is disclosed, for example, in JP 08275127 A, 1996 (Video signal processing apparatus). Referring to this document, video identifier, or video blanking identifier (VBI) is inserted in vertical blanking periods to control the reproduction of image information. VBIs are inserted in the 20-th vertical blanking period of the first field and 283-th vertical blanking period of the second field. Further, in effective video signal areas after horizontal synchronizing signals and color burst signals, 2 bit reference signal and 20 bit information signal are inserted. The two bits from the above-mentioned 20 bit information signal are used for copy generation management system (CGMS) which controls the reproduction of image information.

VBI and CGMS are applicable for analogue video signals in 525 line NTSC, 625 line PAL, and 1125 line High Definition Video System.

However, VBI can be easily eliminated by filtering, because VBI are inserted in fixed positions. Therefore, illegal reproduction can not be prevented perfectly.

Accordingly, visible or invisible electronic watermark becomes an alternative.

Here, the visible electronic watermark has an effect to appeal visually not to reproduce and misappropriate the displayed image information, because prescribed charactes and figures are added to image information by using the visible electronic watermark.

The visible electronic watermark is disclosed, for example, in JP 08241403 A, 1996 (Digital watermarking without color change in image). Referring to this document, only brightness is changed in picture elemnts corresponding to opaque part of the visible electronic watermark data. The brightness is determined by such parameters as color components, random numbers, and values of picture elements of the visible watermark data.

On the other hand, the invisible electronic watermark is recognized visually, because it is imbedded in image information without degrading the image quality.

For example, author of image information may be identified by the invisible electronic watermark. Further, the invisible electronic watermark may notify users that the image information is prohibited to reproduce, or actuate reproduction prohibition mechanism in VTR.

The invisible electronic watermark may be inserted, for example, in the least significant bit (LSB) in picture element, because the LSB does not affect so much the image quality. However, the LSB is eliminated easily by low pass filtering, or image information compression. Therefore, in this case, it becomes difficult to detect filtered or compressed invisible electronic watermarks.

Another electronic watermark is disclosed in Nikkei Electronics 1996, 4.22, No. 660, 13 p). Referring to this document, Image information is transformed in frequency space, and the electronic watermark is imbedded in the dominant frequency components. Therefore, the electronic watermark is not easily eliminated by filtering or image compression. Furthermore, when random numbers, for example, under the normal distribution, are employed, the electronic watermarks rarely interfere with each other, do not affect image quality so much, and are not easily destroyed.

Here, the electronic watermark by using the frequency transformation is explained, referring to FIGS. 7 to 11.

Figure 7:
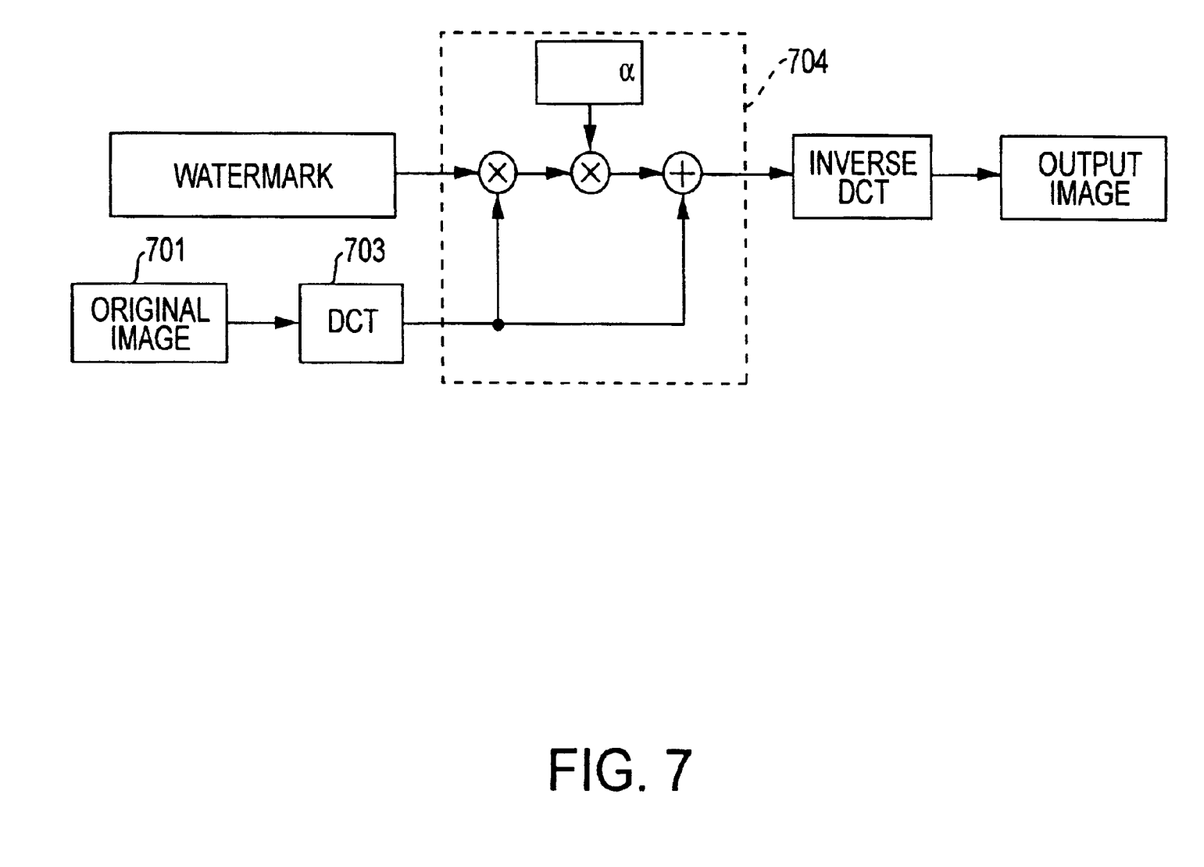
FIG. 7 is a block diagram of a conventional detection system for detecting electronic watermark.

As shown in FIG. 7, original image 701 is transformed by discrete cosine transformation (DCT) 703. "n" data f(1),f(2), . . . ,f(n) is chosen among the frequency components of which amplitudes are great. Further, an electronic watermark of which frequency components are w(1),w(2), . . . ,w(n) is assumed to follow the normal distribution with average 0 and variance 1. Watermark imbedding means 704 calculates for each "i"

$$F(i)=f(i)+\alpha \cdot |f(i)| \cdot w(i),$$

where $\alpha$ is a scaling factor

Then, output image 710 with watermark is obtained through inverse DCT means 709.

The imbedded watermark is detected on the basis of known original image data and known w(i) where i=1 to n.

Figure 8:
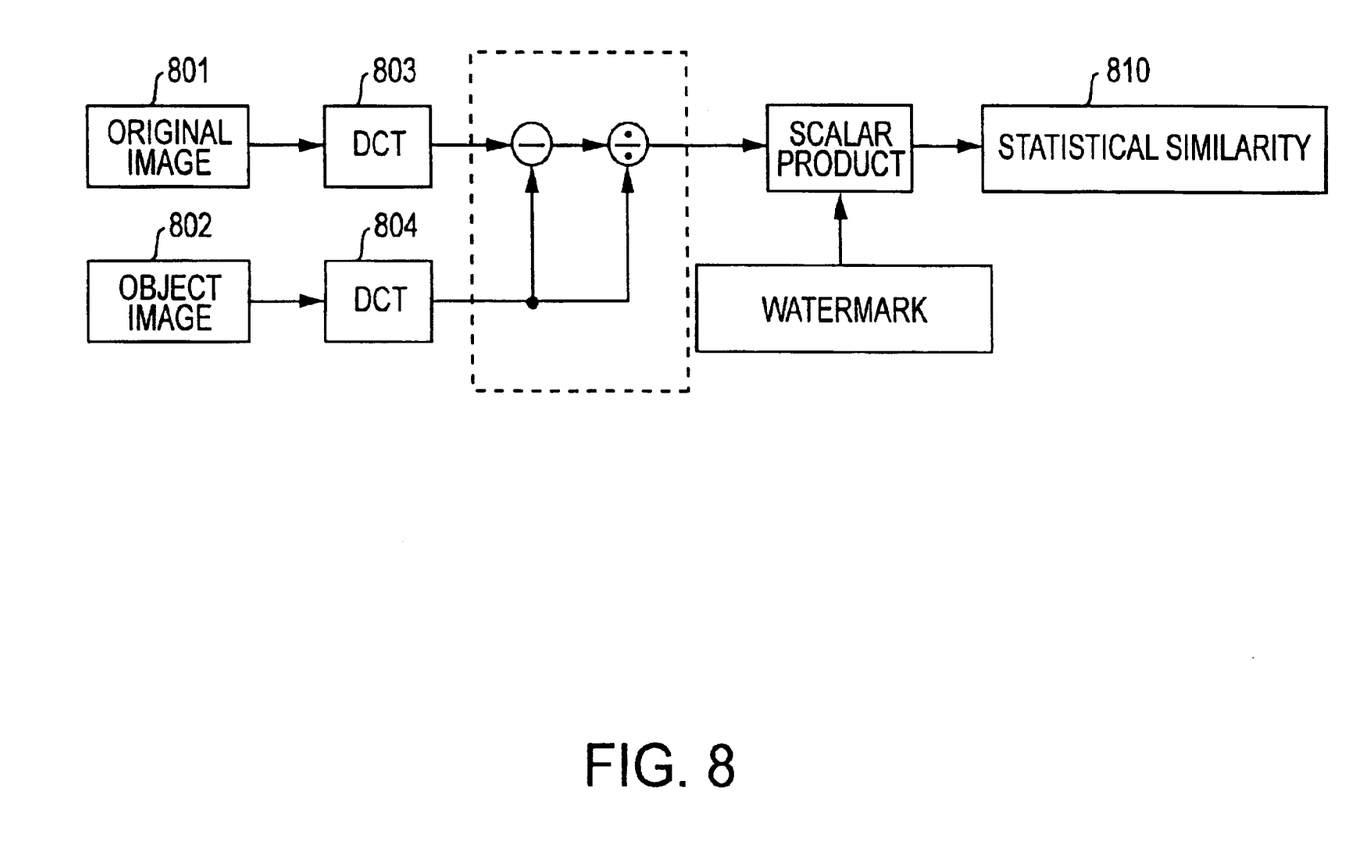
FIG. 8 is another block diagram of a conventional detection system for detecting electronic watermark.

As shown in FIG. 8, object image 802 with w(i) is transformed by DCT 804 to obtain its frequency components F(1), F(2), . . . ,F(N). At the same time, original image 801 is transformed by DCT 803 to obtain its frequency components f(1), f(2), . . . ,f(N). Then, the watermark data W(i) is calculated. Here, W(i) is defined as (F(i)−f(i))/f(i). Further, statistical similarity C is defined as (W·w)/(WD·wD), where (W·w) is a scalar product, WD and wD are the absolute values of W and w, respectively. Finally, statistical similarity determination means 810 determines that electronic watermark is imbedded in object image 802, when C is greater than a prescribed value.

The watermark detection by the statistical similarity requires the original image. Therefore, the author of the original image can use this method. However, general users of playback apparatus such as, for example, VTR, can not use this method. Accordingly, the following method is proposed for the general users of MPEG (Moving Picture Experts Group) system which handles compressed moving pictures, according to ISO (International Standardization Organization) protocol.

Figure 9:
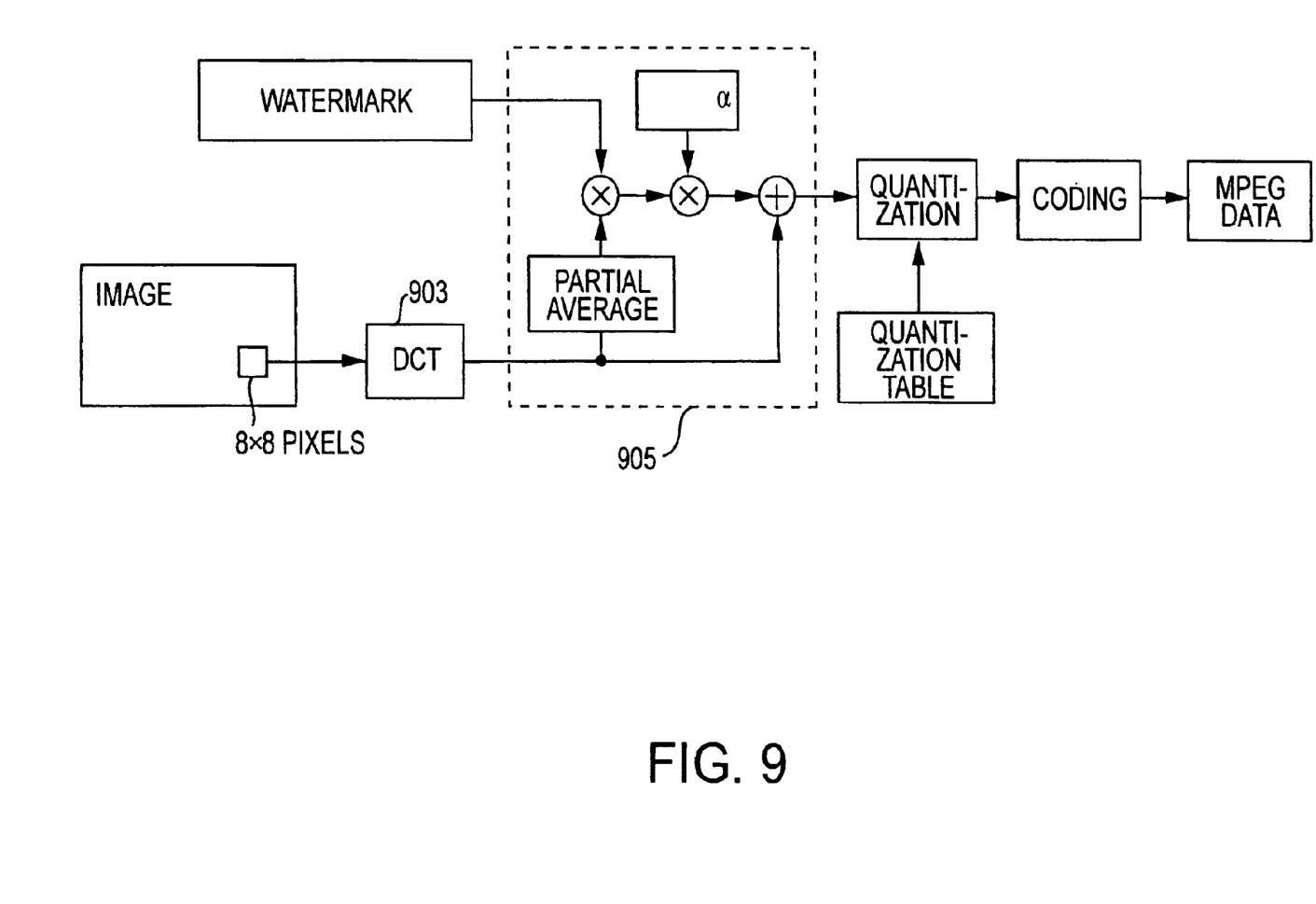
FIG. 9 is a block diagram of a conventional detection system for detecting electronic watermark embedded in image compressed by MPEG protocol of ISO.

As shown in FIG. 9, in the above-mentioned method for MPEG system, electronic watermark is embedded in blocks which are the areas of 8 pixels×8 pixels divided from the original image.

At first, the original image is transformed by DCT 903 to obtain f(1),f(2), . . . ,f(n) where f(1),f(2), . . . ,f(n) are selected in order of amplitude of the obtained frequency components and f(1) is minimum. Again, electronic watermark is assumed to follow the normal distribution with average 0 and variance 1. Then, electronic watermark embedding means 905 calculates for each "i"

$$F(i)=f(i)+\alpha \cdot avg(f(i)) \cdot w(i)$$

Here, $\alpha$ is a scaling factor, and avg(f (i)) is an average of |f (i−1)|, |f (i)|, and |f (i+1)|. In the following, avg(f (i)) is referred to as partial average. Then, MPEG data is obtained through quantization and coding.

The original image data is not required. Only the data w(i) is required, where "i" is 1 to n.

Figure 10:
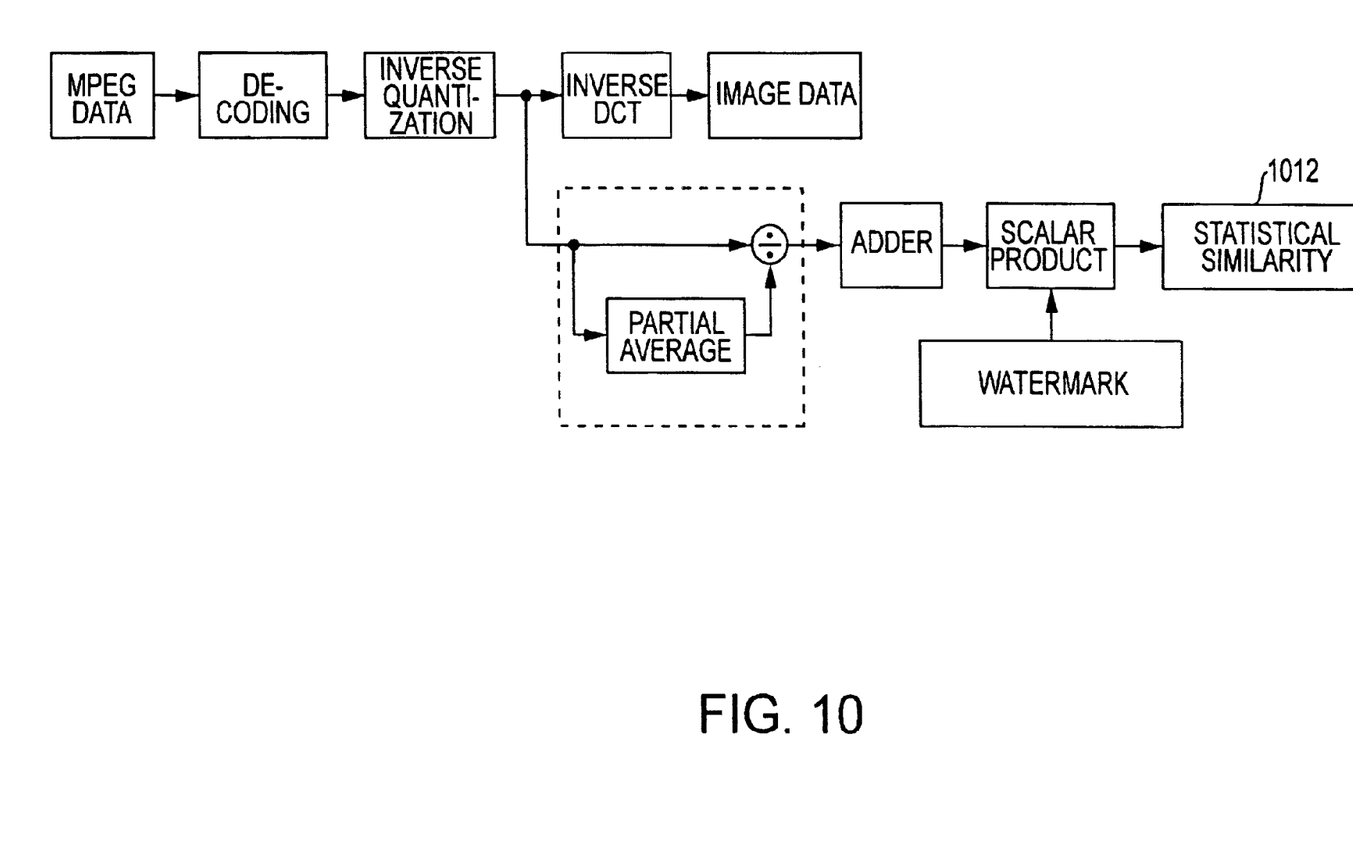
FIG. 10 is a block diagram of a conventional detection system for detecting electronic watermark embedded in image compressed by MPEG protocol of ISO, after the inverse DCT.

As shown in FIG. 10, after inverse quantization of MPEG data, F(1),F(2), . . . ,F(n) are selected in order of amplitude of the obtained frequency components, where F(1) is minimum. Then, electronic watermark data W(i) defined as F(i)/avg(F(i)) is calculated for each "i". Further, WF(i) defined as a summation of W(i) over one frame (one picture) of the expanded MPEG image 1101 is calculated for each "i". Next, statistical similarity C defined as (WF·w)/(WFD·wD), where (WF·w) is a scalar product, WFD and wD are the absolute values of WF and w, respectively. Finally, statistical similarity determination means 1109 determines that electronic watermark is imbedded in the expanded MPEG data, when C is greater than a prescribed value.

Figure 11:
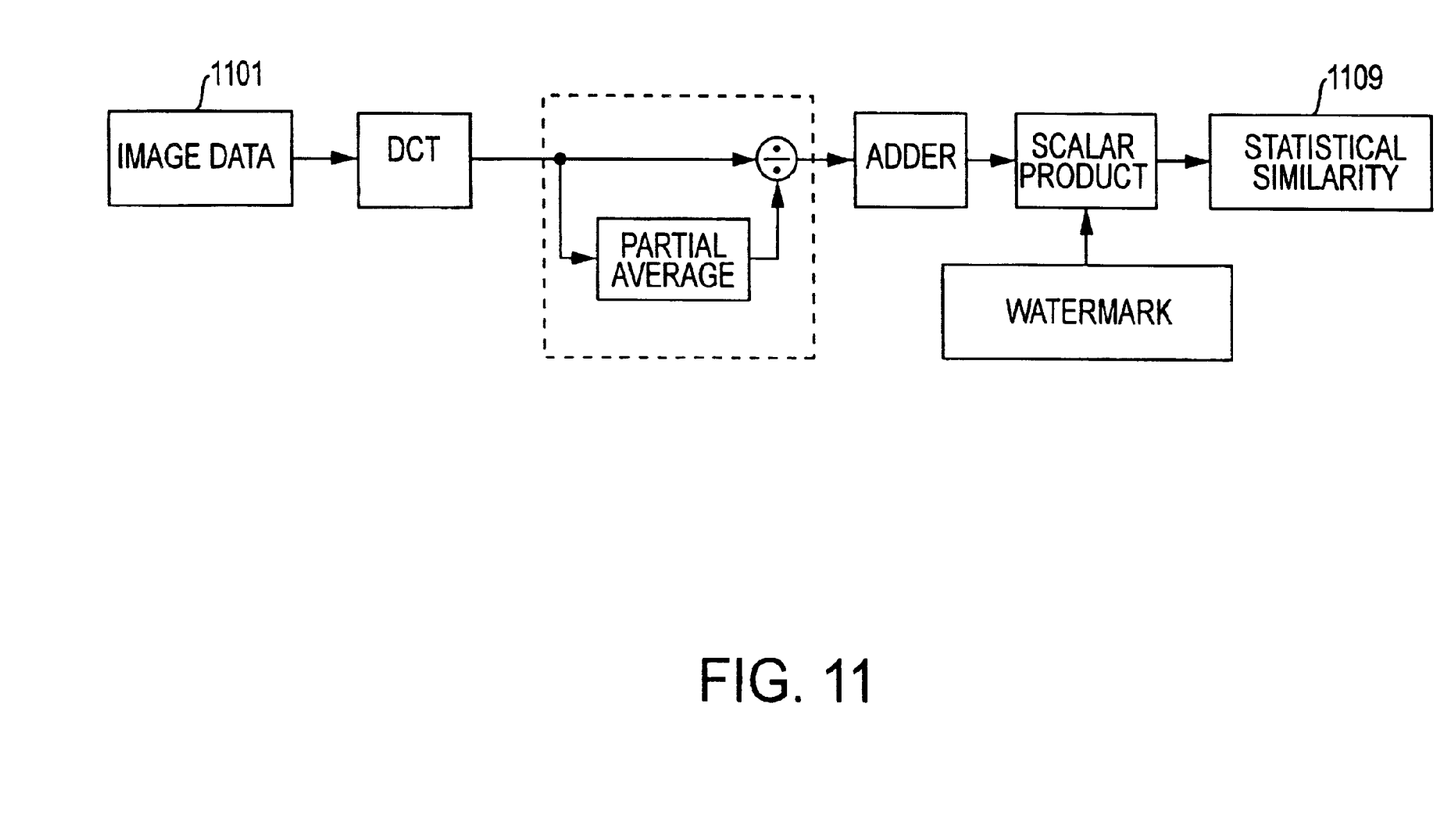
FIG. 11 is a block diagram of a conventional detection system for detecting electronic watermark embedded in image compressed by MPEG protocol of ISO, after completing the expansion processing.

As shown in FIG. 11, electronic watermark is also detected from expanded MPEG image. After DCT of expanded MPEG data 1101, F(1),F(2), . . . ,F(n) are selected in order of amplitude of the obtained frequency components of image data 1101, where F(1) is minimum. Then, electronic watermark data W(i) defined as F(i)/avg(F(i)) is calculated for each "i". Further, WF(i) defined as a summation of W(i) over one frame (one picture) of the original image is calculated for each "i". Next, statistical similarity C defined as (WF·w)/(WFD·wD), where (WF·w) is a scalar product, WFD and wD are the absolute values of WF and w, respectively. Finally, statistical similarity determination means 1109 determines that electronic watermark is imbedded in othe expanded MPEG image 1101, when C is greater than a prescribed value.

However, a scale of circuit for changing the attribute of image becomes too big, if the same procedure is executed twice, when the attribute of image transformed by DCT should be changed.

Further, the quality of output image is degraded, if the same procedure is executed twice. This is because DCT is executed for both of the detection of attribute and the change of attribute.

SUMMARY OF THE INVENTION

Therefore, an object of the present invention is to change the attribute of input image, after detecting the attribute of the input image by executing DCT.

A system for changing attribute of image by electronic watermark of the present invention adds a prescribed insert data to an electronic watermark embedded in an image.

The attribute change system of the present invention comprises: an image input means for inputting image data in which electronic watermark is imbedded; a discrete cosine transformation (DCT) means for transforming the image data; a determination means for calculating a statistical similarity between the electronic watermark and a prescribed electronic watermark; an attribute detection means for outputting an attribute of the image data on the basis of an output from the determination means; a plurality of memories for storing said insert data; a selector for selecting one of the insert data; an insert data register for storing an output from said selector; a brightness register for storing brightness signal of the image data; a color difference register for storing color difference signal of the image data; and an adder for adding the output of the brightness register and the output of the color difference register.

According to the present invention, both the inputted image and the output image possess electronic watermarks, because the system of the present invention can change the attribute of image. Therefore, illegal reproduction of image can be prevented by providing apparates of general public such as VTR with the system of the present invention.

Further, the attribute is not always changed, because the system of the present invention is provided with selector. Furthermore, output image is obtained on the real time basis, because the insert data is inserted into the inputted image successively.

Further, electronic watermark can be inserted and can be changed in case of analog composite signal.

PREFERRED EMBODIMENT OF THE INVENTION

In the following, a mode of embodiment of the present invention is explained, referring to the drawings.

Figure 1:
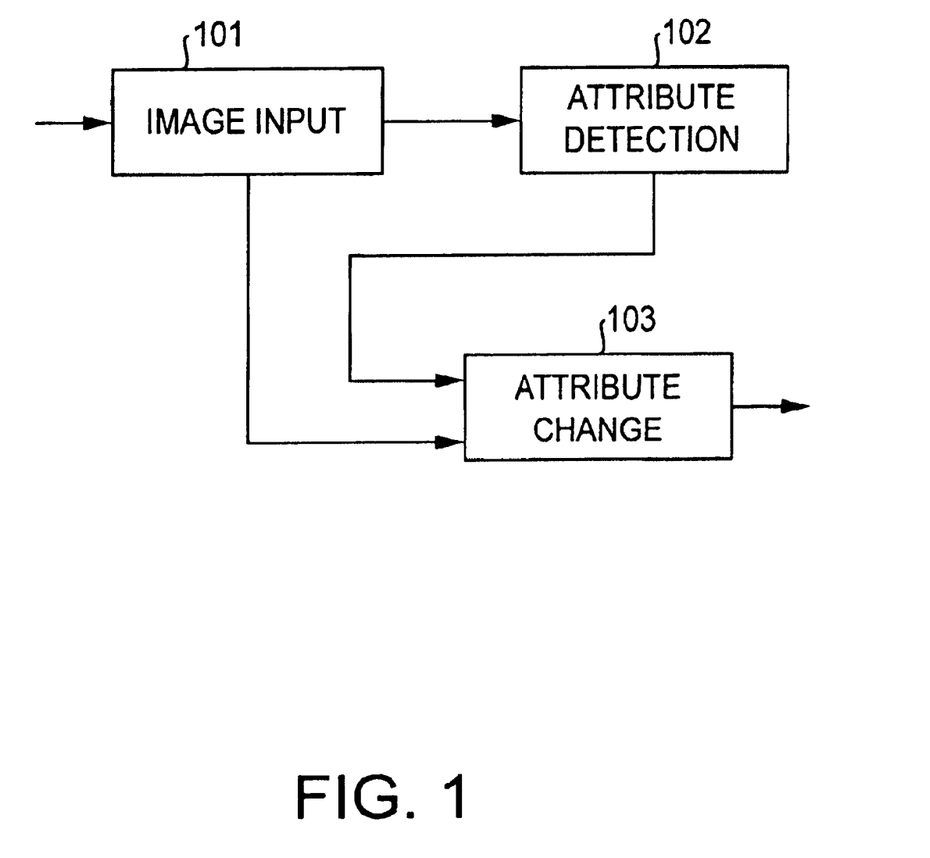
FIG. 1 is a block diagram of attribute detection apparatus in the system of the present invention.

A block diagram of a system for changing attribute of image by electronic watermark of the present invention is shown in FIG. 1. This system comprises image input apparatus 101 for inputting images with electronic watermark, attribute detection apparatus 102 for detecting the attribute of the inputted images, and attribute change apparatus 103 for changing the detected attributes by inputting the images and the detected attribute of the images.

For example, attribute change apparatus 103 changes the attribute "A" which means that reproduction is permitted only once of the inputted image into a new attribute "B" which means that reproduction is prohibited.

Concretely explaining the above-mentioned example, the inputted image possesses the attribute "A" by an electronic watermark embedded in the inputted image. Attribute detection apparatus 102 extracts the embedded electronic watermark "A" by inputting the inputted image. The detected watermark "A" and the inputted image are further inputted into attribute change apparatus 103 in order to output the inputted image with the attribute "B".

Figure 2:
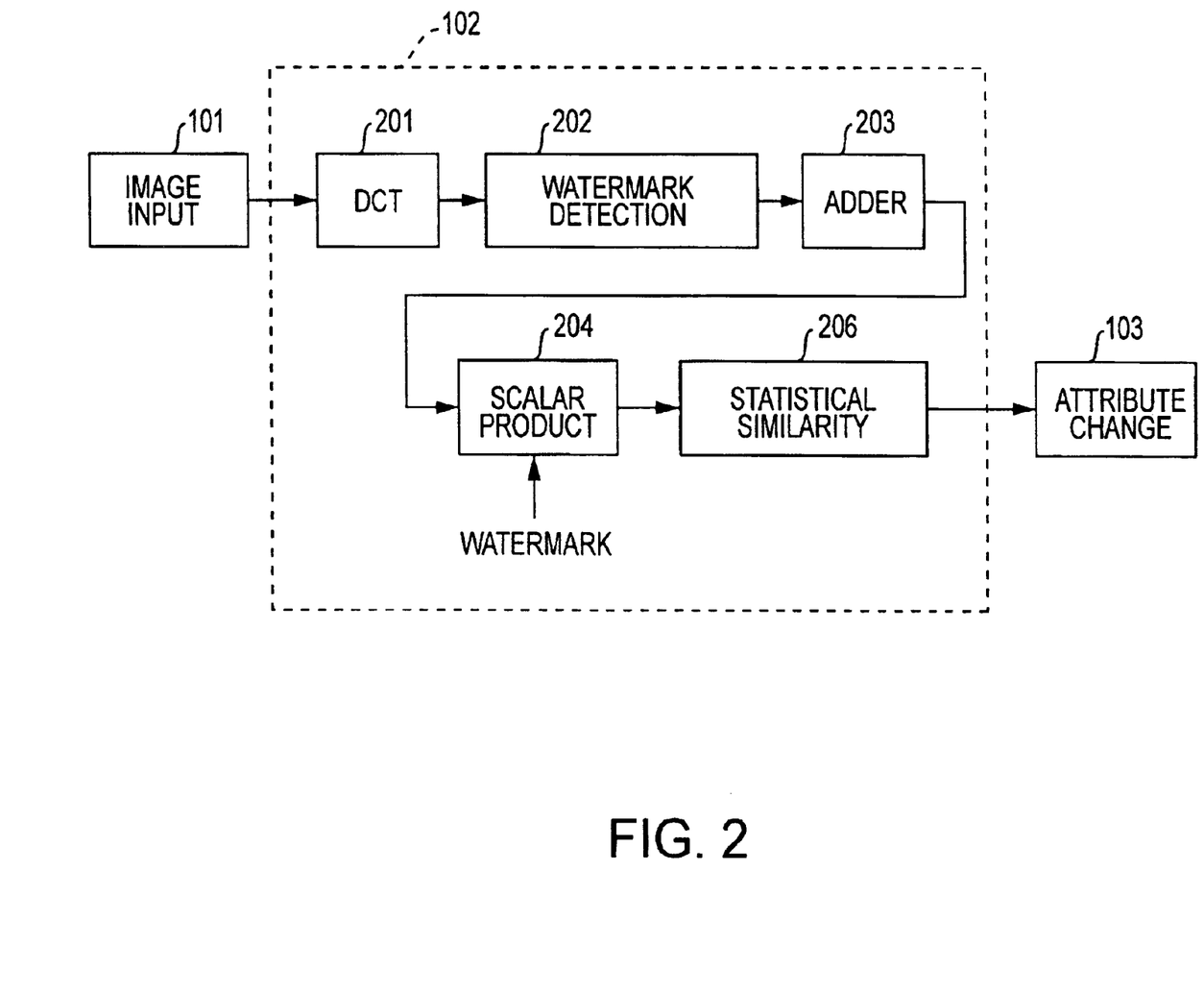
FIG. 2 is a block diagram of attribute detection apparatus in the system of the present invention.

A block diagram of attribute detection apparatus 102 is shown in FIG. 2. The inputted image is transformed by DCT means 201 to extract an estimation value of the embedded electronic watermark data in frequency space by using electronic watermark detection means 202. Then, the statistical similarities between known electronic watermarks and the extracted electronic watermark data are calculated. Thus, attribute detection result 103 of the inputted image is obtained.

Figure 3:
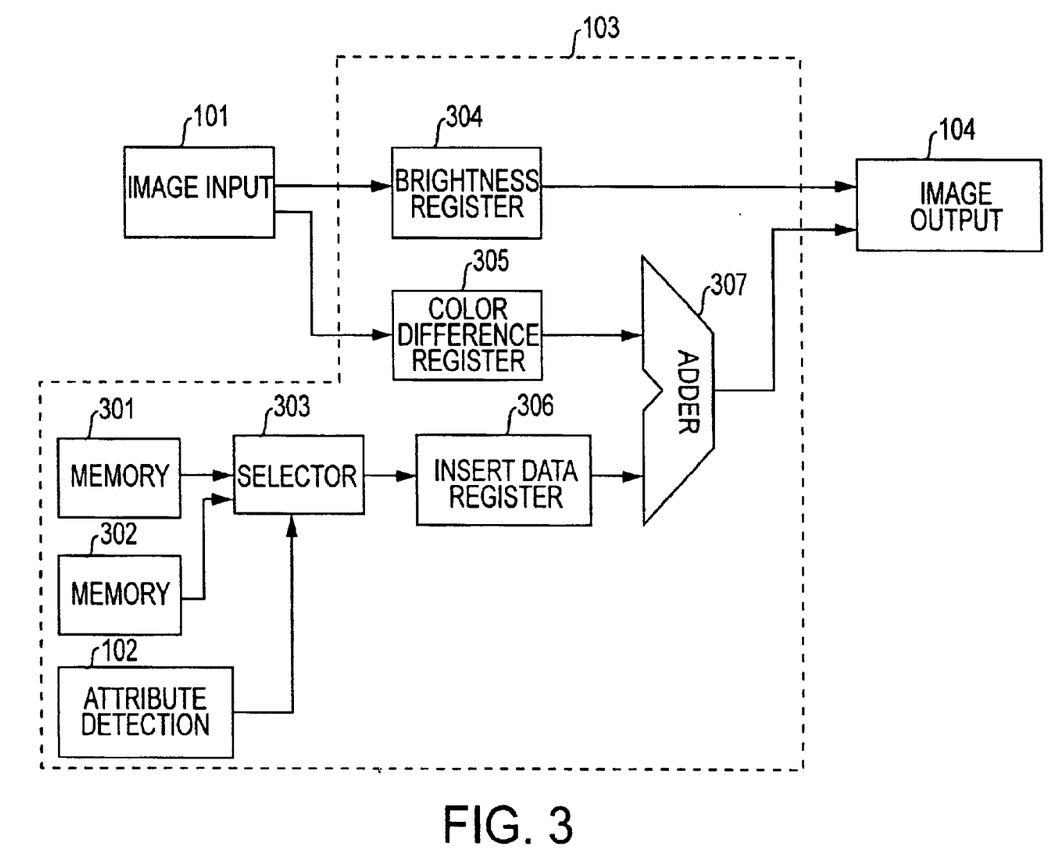
FIG. 3 is a block diagram of attribute change apparatus in the system of the present invention.

A block diagram of attribute change apparatus 103 is shown in FIG. 3. Attribute change apparatus 103 comprises selector 303, insert data register 306 for storing the output of selector 303, brightness register 304 for storing the brightness signal of the inputted image, color difference register 305, and adder for adding the output of color difference register 305 and the output of insert data register 306. Here, selector 303 selects one of the insert data stored in a plurality of memory areas, for example, memory 301 and memory 302, on the basis of the attribute inputted from attribute detection apparatus 102.

Then, the output of adder 307 and the output of brightness register 304 are inputted into image output apparatus 104 to obtain output image.

Figure 4:
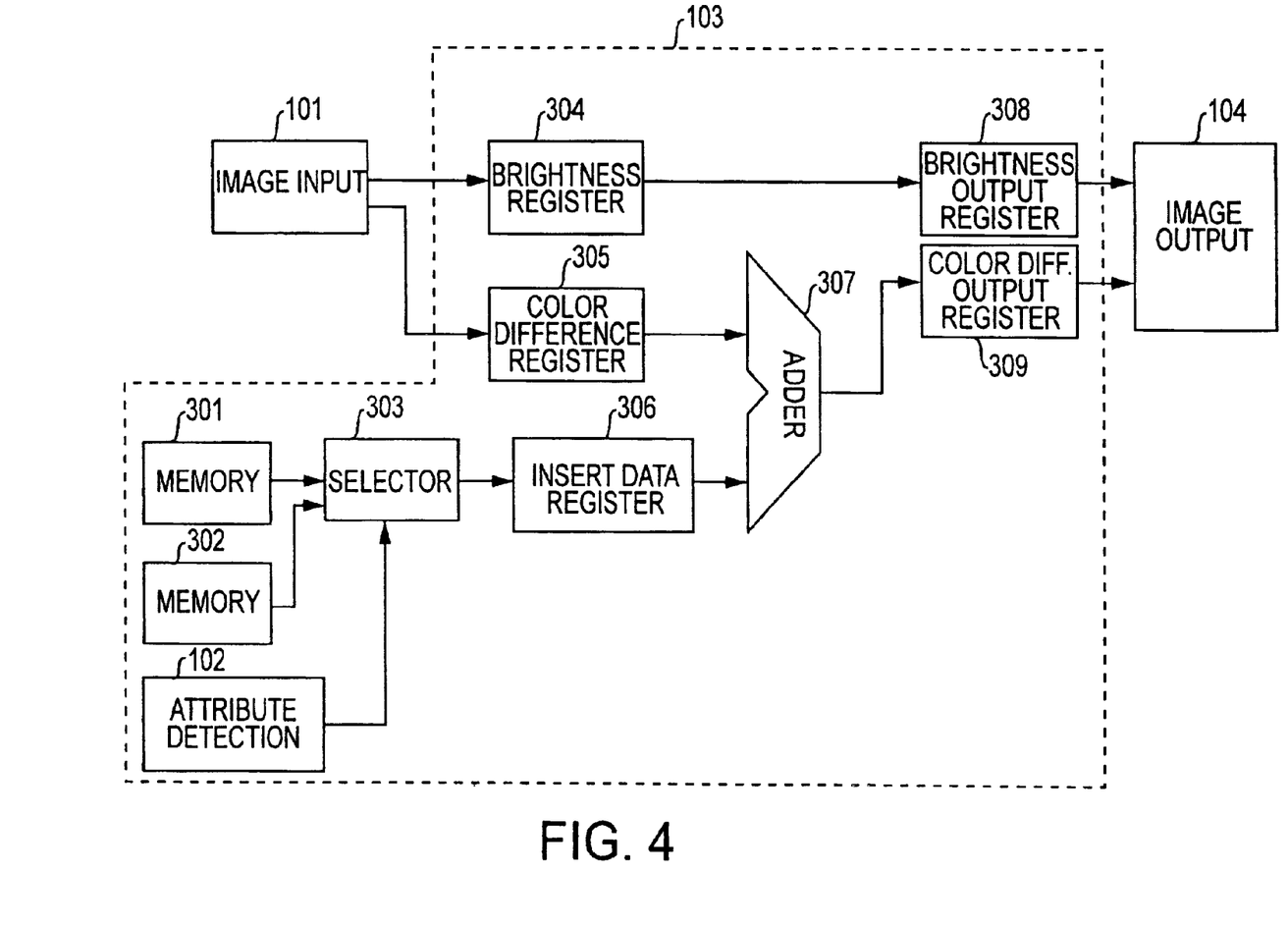
FIG. 4 is a block diagram of another attribute change apparatus in the system of the present invention.

A block diagram of another attribute change apparatus 103 is shown in FIG. 4. This attribute change apparatus 103 further comprises color difference output register 309 for inputting the output of adder 307, and brightness output register 308 for inputting the output of brightness register 304 to obtain output image.

The memories as shown in FIGS. 3 and 4 is merely an example. The number of memories may be greater than two. Further, a plurality of memory areas may be assigned in a single memory device such as read only memory (ROM), or random access memory (RAM).

The insert data stored in those memories are additive data which changing the attribute of the inputted image.

One of the above-mentioned insert data may be null data, wherein every bit is zero for example. The insert data is selected by selector 303, depending upon the result of attribute detection. For example, memory 301 may be selected, when "1" is detected, while memory 302 which stores the null data may be selected, when "0" is detected.

When the data are stored in brightness register 304 and color difference register 305, its timing in the data stream of the inputted image must be the same timing when the insert data is stored in insert data register 306.

Adder 307 adds the data stored in color difference register 305 and the data stored in insert data register 306. Therefore, when the data stored in insert data register 306 is null data, the detected attribute remains unchanged. Or, when the attribute of the inputted image is something other than "A", the attribute of the output image is not changed to "B".

Adder 307 itself is well known, so an explanation thereof is omitted.

As above, the construction of the present invention was explained.

Next, the operation of the present invention is explained.

Figure 5:
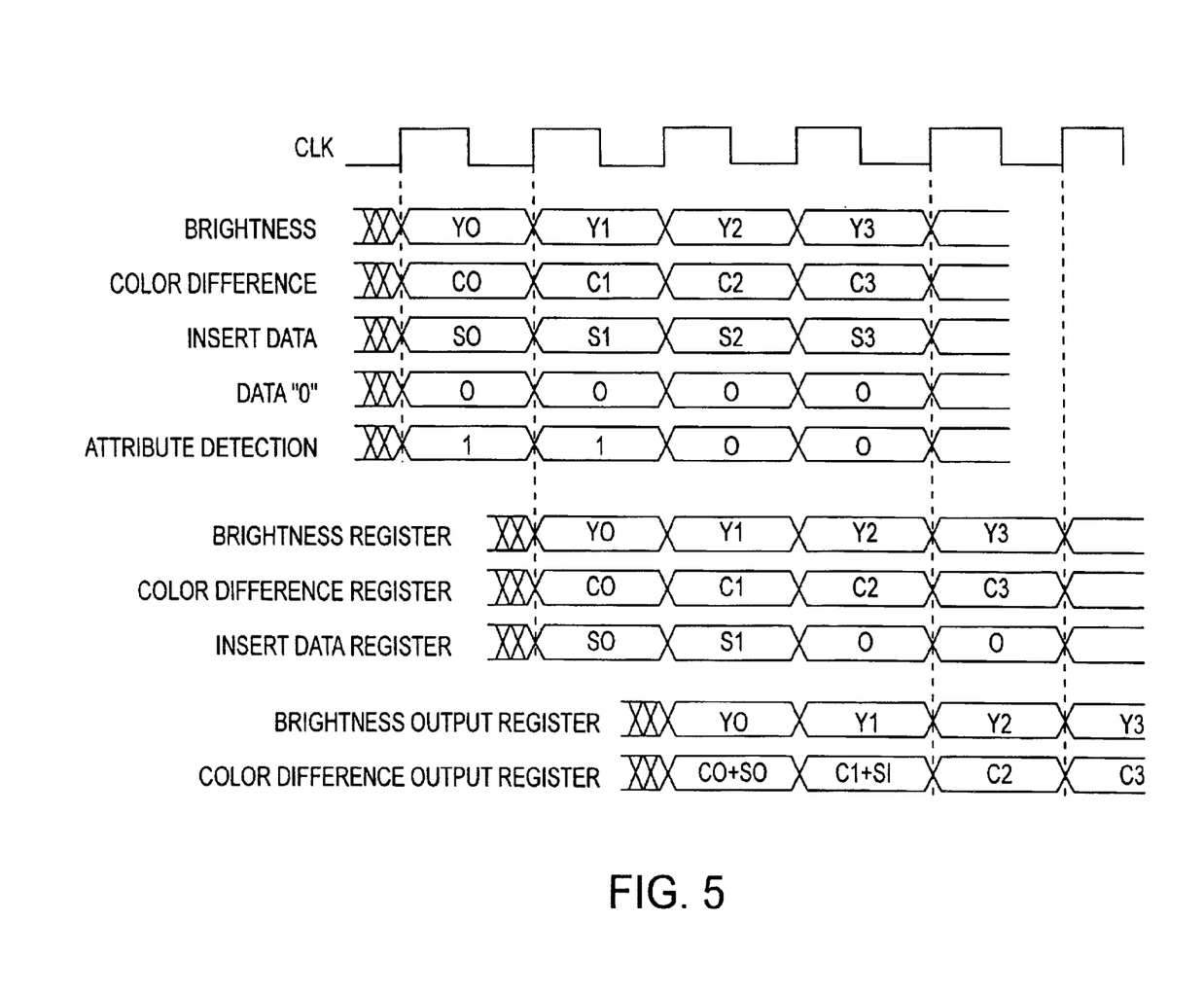
FIG. 5 is a timing chart for explaining the operation of attribute chane apparatus in the system of the present invention.

A timing chart for explaining the operation of attribute change apparatus 103 is shown in FIG. 5. As shown in FIG. 5, at the timing when the brightness signal and the color difference signal have been inputted, the insert data in memory 301 is ascertained. The insert data in memory 302 is always "0". At the same timing as mentioned above, the result of attribute detection is inputted into selector 303. Here, it is assumed that the insert data in memory 301 is selected, when the detection result is "1", while the insert data in memory 302 is selected, when the detection result is "0".

At the next timing when the next clock rises up, brightness register 304 accepts the brightness signal, color difference register 305 accepts the color difference signal, and insert data register 306 accepts the insert data from selector 303.

At the next timing to the above-mentioned "next timing", brightness output register 308 accepts the brightness signal, and color difference output register 309 adds and stores the color difference signal and the insert data.

Thus, the inputted image with the attribute "A" is processed and is outputted as output image with the attribute "B". However, the inputted image is outputted as it is, when the insert data "0" is selected.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

The present invention is not limited to the mode of embodiment as explained above. Analog composite signal may also be inputted.

Figure 6:
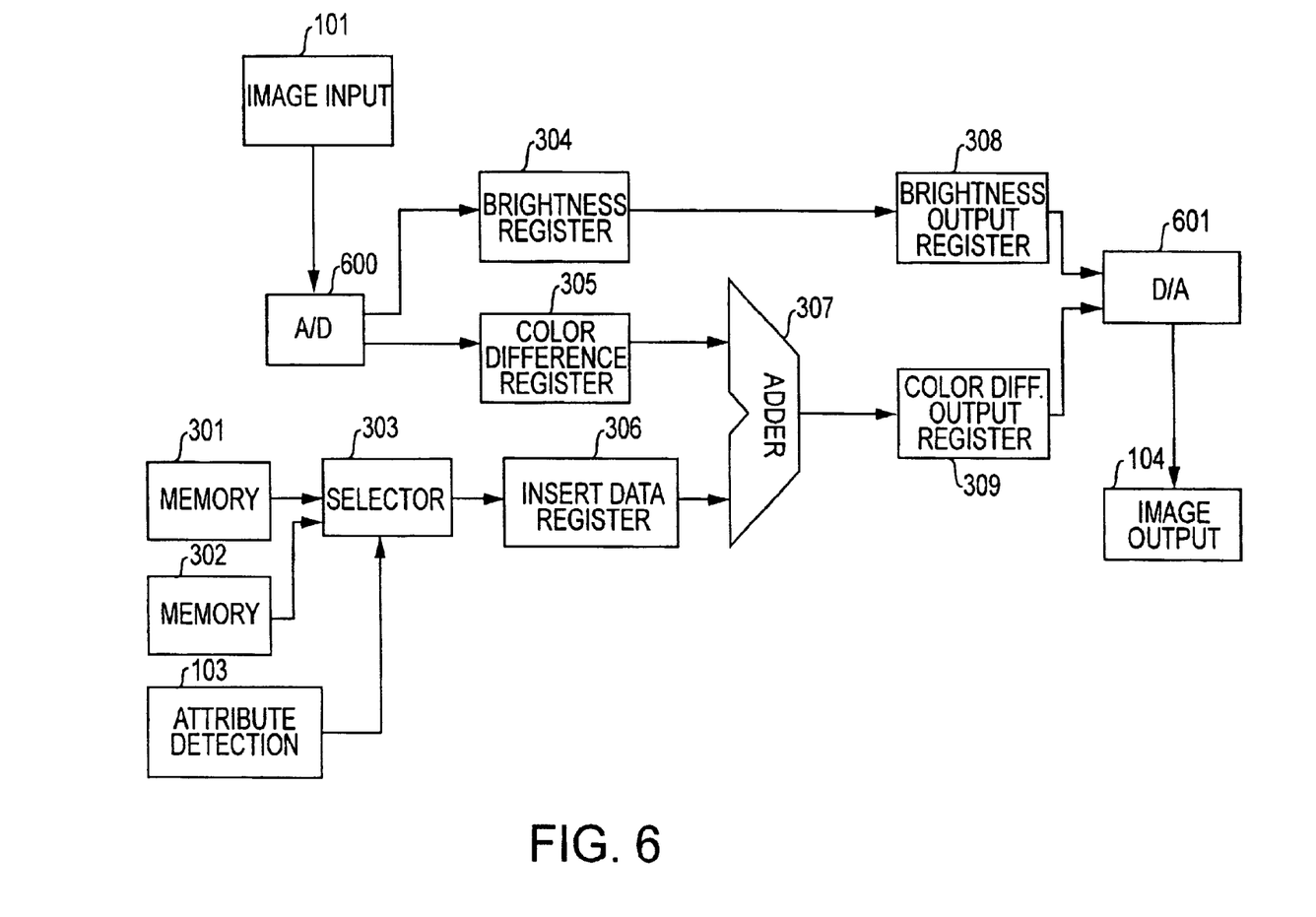
FIG. 6 is a block diagram of still another attribute change apparatus in the system of the present invention.

A block diagram of still another attribute change apparatus in the system of the present invention is shown in FIG. 6 6. The analog composite signal is inputted into image input apparatus, is converted into digital signal by A/D converter 600, and is processed as already explained. Further, analog composite output is obtained by D/A converter 601. Further, D/A converter 601 is not always necessary.

What is claimed is:

1. A method for superposing a second watermark on an image data in which a first watermark has been embedded, comprising the steps of:

storing a plurality of candidates for said second watermark;

detecting said first watermark from said image data;

selecting one of said candidates as said second watermark dependent on said first watermark; and superposing said second watermark on said image data.

2. The method for superposing a second watermark on an image data in which a first watermark has been embedded as set forth in claim 1, wherein said superposing step superposes said second watermark on color component of said image data and does not superpose said second watermark on luminance component of said image data.

3. The method for superposing a second watermark on an image data in which a first watermark has been embedded as set forth in claim 1, wherein said superposing step superposes said second watermark on said image data in time domain rather than frequency domain.

4. The method for superposing a second watermark on an image data in which a first watermark has been embedded as set forth in claim 1, wherein if said type of said first watermark represents that copying of said image data is allowed only once, then said image data after said second watermark has been superposed thereon represents that copying of said image is inhibited.

5. A system for superposing a second watermark on an image data in which a first watermark has been embedded, comprising:

storing means for storing a plurality of candidates for said second watermark;

detecting means for detecting said first watermark from said image data;

selecting means for selecting one of said candidates as said second watermark dependent on said first watermark; and     superposing means for superposing said second watermark on said image data.

6. The system for superposing a second watermark on an image data in which a first watermark has been embedded as set forth in claim 5, wherein said superposing means superposes said second watermark on color component of said image data and does not superpose said second watermark on luminance component of said image data.

7. The system for superposing a second watermark on an image data in which a first watermark has been embedded as set forth in claim 5, wherein said superposing means superposes said second watermark on said image data in time domain rather than frequency domain.

8. The system for superposing a second watermark on an image data in which a first watermark has been embedded as set forth in claim 5,     wherein if said type of said first watermark represents that copying of said image data is allowed only once, then said image data after said second watermark has been superposed thereon represents that copying of said image is inhibited.

* * * * *